(No Model.) 2 Sheets—Sheet 2.

C. W. HASELTON.
DEVICE FOR PACKING BOOT AND SHOE UPPERS.

No. 357,556. Patented Feb. 8, 1887.

WITNESSES
H. Brown.
A. D. Harrison.

INVENTOR:
C. W. Haselton
by Wright, Brown & Quinby
Attys.

UNITED STATES PATENT OFFICE.

CHARLES W. HASELTON, OF PETERBOROUGH, NEW HAMPSHIRE, ASSIGNOR OF ONE-HALF TO HENRY FELLOWS, OF HAVERHILL, MASS.

DEVICE FOR PACKING BOOT AND SHOE UPPERS.

SPECIFICATION forming part of Letters Patent No. 357,556, dated February 8, 1887.

Application filed October 27, 1886. Serial No. 217,312. (No model.)

*To all whom it may concern:*

Be it known that I, CHARLES W. HASELTON, of Peterborough, in the county of Hillsborough and State of New Hampshire, have invented certain new and useful Improvements in Devices for Packing Boot and Shoe Uppers, of which the following is a specification.

This invention has for its object to provide a simple and convenient device to aid an operative in a boot or shoe factory to assemble a lot of uppers in a pile or bunch for storage or removal to another department of the factory; and to this end it consists in the improvements which I will now proceed to describe and claim.

Figure 1:
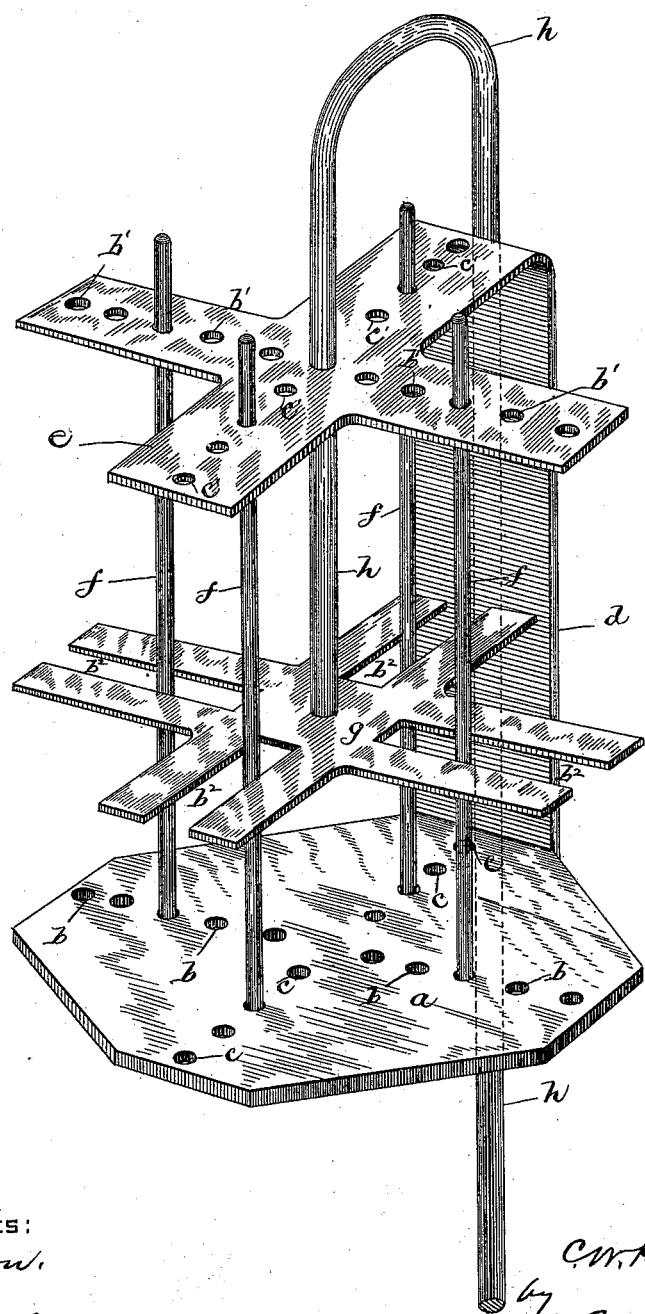
Figure 2:
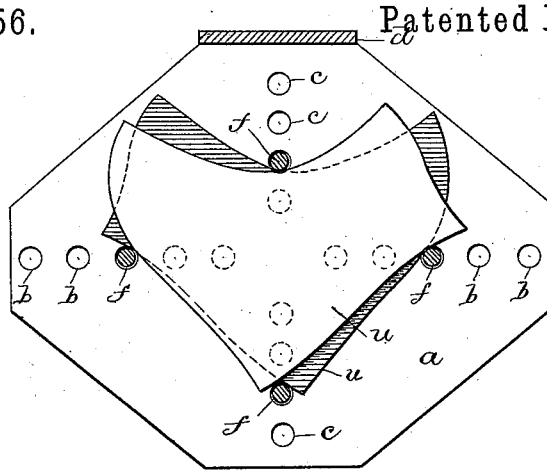
Figure 3:
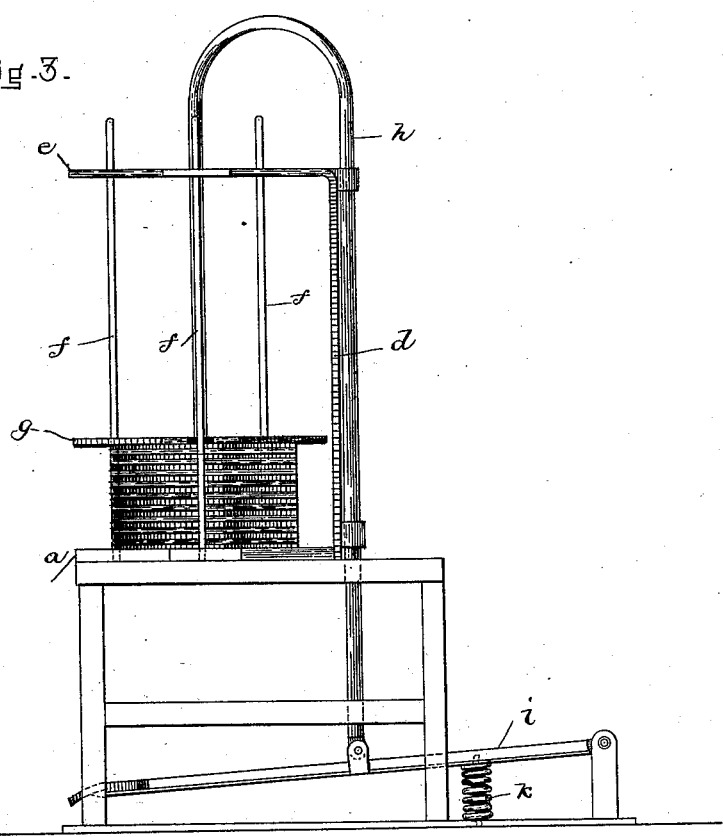

Of the accompanying drawings, forming a part of this specification, Figure 1 represents a perspective view of my improved packing device. Fig. 2 represents a plan of the base or lower portion of the device. Fig. 3 represents a side elevation of the device.

The same letters of reference indicate the same parts in all of the figures.

In the drawings, $a$ represents a base or bed, which is provided with a row of holes, $b$, and another row of holes, $c$, said rows extending substantially at right angles to each other, as shown in Fig. 2. To the base is attached a vertical standard, $d$, the upper end of which supports a horizontal plate or spider, $e$, having holes $b'$ and $c'$ arranged in rows to coincide with the holes $b$ and $c$.

$f f f f$ represent rods adapted to be loosely inserted in the holes $b b'$ and $c c'$, and constituting vertical guides, between which a series of uppers may be assembled to form a pile or package, as indicated in Fig. 2. The rods may be adjusted as to distance between them by placing them in different holes, so that they can be accommodated to various sizes of uppers, it being the intention to have the rods, when adjusted for a given size of upper, so arranged that they will present four bearing-surfaces for the edges of the uppers, as shown in Fig. 2.

$g$ represents a movable platen or follower, supported between the plate $e$ and bed $a$ by a rod, $h$, which is attached to the center of said follower and projects upwardly therefrom through a hole in the plate $e$, and is bent above said plate and extends downwardly to a treadle, $i$, or other suitable device, whereby it may be raised and depressed with the follower. The follower is provided with slots $b^2 b^2$, arranged to coincide with the holes $b b'$ and $c c'$, the rods $f$ passing through said slots, as shown in Fig. 1. I prefer to support the rod $h$ and follower $g$ by a spring, $k$, placed under the treadle.

The operation is as follows: The operator having arranged the rods $f$ to the size of the uppers which are to be assembled, places the uppers $u$ between said rods, the first upper being placed on the base and the second placed in a reversed position on the first, as shown in Fig. 2, and so on until the desired number have been assembled. A binding-cord placed on the base before commencing to assemble the uppers is then laid over the top of the pile of uppers and the follower $g$ is depressed and compresses the pile. The operator while the pile is thus compressed ties the cord, thus securing the uppers in a package. The follower is then raised and the package is removed.

It will be seen that by this device the operator is enabled to quickly make a compact and symmetrical package of uppers, and to adjust the device to uppers of various sizes.

I claim—

The improved device for packing uppers, consisting of the base having the holes $b c$, the plate $e$, supported above said base, and having the holes $b' c'$, the rods $f$, adapted to be placed in said holes, the vertically-movable follower $g$, placed between said plate and bed, and means for raising and depressing the follower, as set forth.

In testimony whereof I have signed my name to this specification, in the presence of two subscribing witnesses, this 16th day of August, A. D. 1886.

CHARLES W. HASELTON.

Witnesses:
CHAS. HALL ADAMS,
MARTIN McDONOUGH.